United States Patent
Maier et al.

(10) Patent No.: US 7,476,268 B2
(45) Date of Patent: Jan. 13, 2009

(54) AIR FILTER

(75) Inventors: Stefan Maier, Besigheim (DE); Frank Pfeiffer, Moensheim (DE)

(73) Assignee: Mann & Hummel GmbH, Ludwigsburg (DE)

( * ) Notice: Subject to any disclaimer, the term of this patent is extended or adjusted under 35 U.S.C. 154(b) by 413 days.

(21) Appl. No.: 11/280,218

(22) Filed: Nov. 17, 2005

(65) Prior Publication Data

US 2006/0107836 A1     May 25, 2006

(30) Foreign Application Priority Data

Nov. 17, 2004    (DE)    .................... 10 2004 000 048

(51) Int. Cl.
  *F02M 35/02*     (2006.01)
  *B01D 53/04*     (2006.01)
(52) U.S. Cl. ........................................ 96/134; 55/385.3
(58) Field of Classification Search ................ 55/385.3;
    95/146; 96/134, 135, 138, 147, 154; 123/518,
    123/519, 198 E
See application file for complete search history.

(56) References Cited

U.S. PATENT DOCUMENTS

| 3,456,635 | A | * | 7/1969 | Hervert | 123/519 |
|---|---|---|---|---|---|
| 3,541,765 | A | * | 11/1970 | Adler et al. | 96/138 |
| 3,572,013 | A | * | 3/1971 | Hansen | 96/138 |
| 3,572,014 | A | * | 3/1971 | Hansen | 96/138 |
| 3,747,303 | A | * | 7/1973 | Jordan | 96/135 |
| 3,849,093 | A | * | 11/1974 | Konishi et al. | 96/138 |
| 4,259,096 | A | * | 3/1981 | Nakamura et al. | 96/138 |
| 4,261,717 | A | * | 4/1981 | Belore et al. | 96/112 |
| 4,279,630 | A | * | 7/1981 | Nakamura et al. | 96/138 |
| 4,289,513 | A | * | 9/1981 | Brownhill et al. | 96/135 |
| 4,418,662 | A | * | 12/1983 | Engler et al. | 96/133 |
| 6,152,996 | A | * | 11/2000 | Linnersten et al. | 96/135 |
| 7,132,007 | B1 | * | 11/2006 | von Blucher et al. | 95/90 |
| 2002/0000362 | A1 | * | 1/2002 | Go et al. | 198/465.2 |
| 2002/0124733 | A1 | * | 9/2002 | Iriyama et al. | 96/134 |
| 2003/0082824 | A1 | | 5/2003 | Dumas et al. | |
| 2004/0065197 | A1 | * | 4/2004 | LaBarge et al. | 95/90 |

* cited by examiner

*Primary Examiner*—Frank M Lawrence
(74) *Attorney, Agent, or Firm*—Crowell & Moring LLP

(57)     ABSTRACT

An air filter, particularly an air filter for an internal combustion engine, having a housing with an unfiltered air inlet and a filtered air outlet. A round filter element is sealingly disposed between the unfiltered air inlet and the filtered air outlet. In addition, an adsorber element provided with adsorbent particles is disposed on an interior wall of the housing such that the adsorber element is arranged within the round filter element.

8 Claims, 1 Drawing Sheet

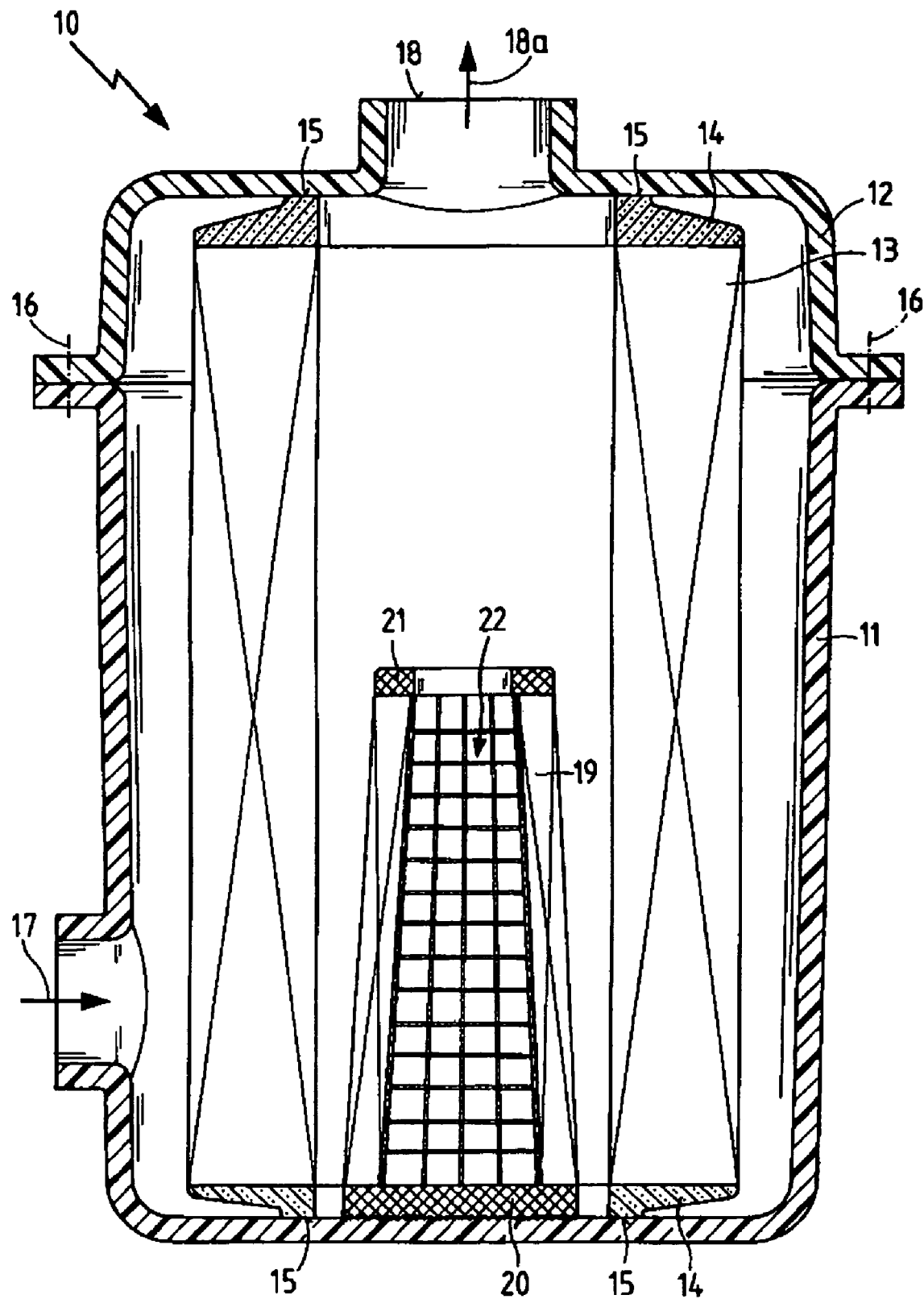

AIR FILTER

BACKGROUND OF THE INVENTION

The present invention relates to an air filter comprising a housing with an unfiltered air inlet and a filtered air outlet, and a round filter element sealingly disposed in the housing between the unfiltered air inlet and the filtered air outlet.

An essential development goal in modern internal combustion engines is to reduce emission of harmful substances. Until now, the development activities have focused primarily on optimizing the exhaust emission control system. Modern exhaust emission control systems meanwhile achieve conversion rates for harmful substances greater than 97%.

Increasing air pollution has led most countries to limit emissions and to continue to tighten these limits. To assure reproducibility and comparability, various test methods, ratings and limits have been developed. In the United States, for example, the limits include the categories ULEV (Ultra Low Emission Vehicle), SULEV (Super Ultra Low Emission Vehicle) and the current strictest category, PZEV (Partial Zero Emission Vehicle).

In connection with the above-described SULEV/ULEV problem, the disadvantage, however, is that hydrocarbons present in the intake manifold of an internal combustion engine, for example, may escape into the environment when the engine is stopped. Any occurring hydrocarbon emissions may have to be minimized in order to comply with the limits specified by law. It is also desirable to remove unburned hydrocarbons from the air guided into the passenger compartment of motor vehicles.

To solve this problem, components with adsorbent-containing filter elements are used in air circuits and air filter housings. Typically, the air ducts are made of plastic. The filter elements used are intended to reduce hydrocarbon emissions and/or prevent hydrocarbon emissions from being discharged. The filter elements are usually designed as pleated filters, ceramic-based solid structures, adsorbent-containing pressed materials or adsorbent beds. As a result, they require a special housing adapted for a given filter type and must be linked to the air circuits in an additional production or packaging step. The conventional filter elements, such as zigzag-shaped pleated filters are usually designed as replaceable cartridge filters.

Published U.S. patent application no. US 2003/082824 A1 discloses an air duct with integrated hydrocarbon sensor and collector. This device is disk-shaped and is situated inline in the air stream passing through the air duct. The adsorber element has a honeycomb structure and is preferably made of activated carbon or activated carbon and a binder.

Drawbacks in all of these solutions include their substantial production complexity, the considerable partial pressure loss and the required special adaptation of the housings and air ducts to the adsorber elements. A further problem is the need for desorbing the adsorber elements, which is typically done while the internal combustion engine is running. In an adsorber element in which the air flows through the element, the pressure loss is quite high but the desorption rate is good. In an adsorber element in which the air sweeps over the element, the desorption rate may be inadequate.

SUMMARY OF THE INVENTION

It is thus an object of the present invention to provide an improved air filter particularly suitable for use with an internal combustion engine.

Another object of the invention is to provide an air filter which can inhibit the emission of hydrocarbons to the ambient environment.

A further object of the invention is to provide an air filter which does not result in excessive pressure losses.

An additional object of the invention is to provide an air filter which exhibits a good desorption rate for adsorbed hydrocarbons.

It is also an object of the invention to provide an air filter which is cost effective and simple to manufacture.

These and other objects are achieved in accordance with the present invention by providing a n air filter comprising a housing with at least one unfiltered air inlet and at least one filtered air outlet; a round filter element sealingly disposed in said housing between the unfiltered air inlet and the filtered air outlet, and an adsorber element comprising adsorbent particles disposed on an inner housing wall of the housing such that the adsorber element is disposed within the round filter element.

The invention thus relates to an air filter, particularly an air filter for an internal combustion engine, with a housing having an unfiltered air inlet and a filtered air outlet, such that a round filter element is sealingly disposed between the unfiltered air inlet and the filtered air outlet. Within the round filter element, an element having adsorbent particles is disposed on an inner housing wall of the housing. The adsorbent particles are preferably activated carbon particles, which may be used in any form known in the art. Other particles which adsorb gaseous substances because of their structure and makeup may also be used, however, e.g., zeolites or silica gel.

Arranging the element having adsorbent particles in the interior of the round filter element has the big advantage that no additional installation space is required for this additional element. This makes it possible simply to retrofit existing systems equipped with a round filter element with an element having adsorbent particles in order to comply with the increasingly stringent laws.

It is advantageous if the element having the adsorbent particles has a substantially round or oval cross-sectional shape at the end faces and is thus substantially adapted to the cross-sectional shape of the round filter element. Along its axial course the element having the adsorbent particles has essentially the shape of a truncated cone or a cone. Because of the substantially round or oval end face, the element may advantageously be disposed in the interior of the round filter element without significant losses, and because of the substantially truncated cone or cone configuration in the axial course of the element having the adsorbent particles, a pressure loss as a result of the element is largely reduced or even practically excluded.

According to one advantageous embodiment of the invention, the element having adsorbent particles is a truncated cone-shaped or cone-shaped filter element with a zigzag-type pleated filter medium having adsorbent particles. The filter medium may be cellulosic, partially synthetic or fully synthetic. The adsorbent particles are for example held between two layers of the filter medium or are permanently bonded to the filter medium, for example by means of an adhesive layer.

In a variation thereof, the element having the adsorbent particles may be a truncated cone-shaped or cone-shaped foam-based filter. The shape is created by a foamed plastic, and the adsorbent particles are permanently bonded thereto, e.g., in the pores of the foam.

In another, alternative solution, the element having the adsorbent particles is a truncated cone-shaped or cone-shaped wound filter. A plurality of layers of a filter medium, which like the zigzag-type pleated filter medium is made from cellulose or a partially synthetic or fully synthetic material, is wound into a truncated cone or a cone. Here, too, the adsorbent particles may be bonded to the respective layers in a gluing process or may be immobilized between the individual winding layers.

All these solutions have in common that the housing-side end face of the filter medium having the adsorbent-particles has the larger diameter while the end face protruding into the housing forms either the tip of the cone or the smaller cone diameter. In all these solutions, the end face protruding into the housing may be open or closed. An open configuration is preferred because it facilitates and simplifies the flow through the element having the adsorbent particles and thereby enhances both adsorption and desorption.

It is advantageous to dispose a support grid on the element having the adsorbent particles, so that it is seated against the contour and supports the element on the inside or the outside and thereby prevents it from collapsing if the pressure conditions are unfavorable. The support grid may also be used to construct the filter element in the desired shape. The support grid may be made of metal or plastic. The width of the grid openings should be selected as large as possible to avoid pressure loss of the flow and to ensure the largest possible surface.

It is advantageous if the element having the adsorbent particles is disposed substantially opposite the filtered air outlet. As a result, while the internal combustion engine is running, the air can flow practically undisturbed and unhindered through the round filter element from the unfiltered side to the filtered side and desorb the element having the adsorbent particles, which is disposed opposite the filtered side. When the internal combustion engine is stopped, the burned hydrocarbons exiting from the cylinder chamber, which are to be filtered, flow from the filtered air outlet into the interior of the round filter element and are directly adsorbed by the element having the adsorbent particles.

It is also possible, however, to dispose the element having the adsorbent particles on the filtered air outlet, concentrically to the filtered air outlet. In this case, the element having the adsorbent particles preferably has the shape of a truncated cone, such that the inside diameter of the open end face, which protrudes into the interior of the housing, approximately matches the inside diameter of the filtered air outlet. This again minimizes the pressure loss caused by the element having the adsorbent particles.

According to another embodiment of the invention, the element having the adsorbent particles is releasably connected to the interior wall of the housing. Feasible, for example, is a clip-in connection or a screwed connection, so that the element can be replaced. In certain situations, this releasability may also be a prerequisite for the replaceability of the actual, round filter element. For this purpose, the element having the adsorbent particles has a sealed end disk on its end face that faces the housing. This end disk is preferably made of plastic, an elastomer foam or paper and has means for a releasable connection to the interior wall of the housing.

As an alternative, the element having the adsorbent particles may also be permanently connected to the interior wall of the housing. This may be realized by a glued or welded connection, for example. Normally, it is not even necessary to replace the element having the adsorbent particles, because it is located on the filtered side of the round filter element, so that the element having the adsorbent particles does not get clogged or blocked. In any case, the element having the adsorbent particles is desorbed by the air required for combustion, which flows past and through it while the internal combustion engine is running.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing FIGURE which is a cross sectional view of an air filter according to the invention.

DETAILED DESCRIPTION OF PREFERRED EMBODIMENTS

The FIGURE shows an air filter 10 having a lower housing section 11 and an upper housing section 12. A round filter element 13, which has an open end disk 14 on each of its end faces, is sealingly disposed within the housing sections 11, 12. The round filter element 13 preferably has a zigzag-type pleated filter medium made, for example, of paper or a nonwoven material.

The end disks 14 are made of a soft, flexible seal material, such as polyurethane foam. Because they axially contact the respective housing sections 11, 12 in the contact region 15, the end disks 14 establish an axial seal between an unfiltered side and a filtered side. The two housing sections 11, 12 are interconnected by a positive-locking and airtight connection 16. The lower housing section 11 has an air inlet 17 for the intake air to be filtered, and the upper housing section 12 has an air outlet 18a for the filtered intake air.

In the interior of the round filter element 13 an adsorber element 19 is disposed opposite the air outlet side 18. This element has a lower, closed end disk 20 and an upper, annular end disk 21. The adsorber element 19 comprises a support medium, such as paper, foam or a nonwoven material, which is provided with adsorbent particles, e.g., activated carbon. The support medium is not limited to this selection, however. Other materials, such as metal, may also be used.

The adsorber element 19 is connected to the bottom of the lower housing section 11 via the lower, closed end disk 20. This connection may be realized as a glued or welded connection or as a screwed or clip-in connection. In the interior of the adsorber element 19, a support member 22 is disposed, which like the adsorber element 19 has the shape of a truncated cone. The support member may be made of plastic or metal and protects the adsorber element 19 against collapsing.

The end disks 20, 21 of the adsorber element 19 may be made of resin, nitrile rubber, polyurethane (PU) foam or a combination of these materials, but an elastic thermoplastic material is preferred. In this case the end disks serve as an end face cover of the adsorber element 19 and may also act as a seal, e.g., if the adsorbent medium is pleated in zigzag fashion. Because of the truncated cone shape of the adsorbent element 19, the airflow through the round filter element 13 is not impaired, so that the pressure loss is no worse than in an air filter without an adsorbent element.

By disposing the adsorbent element 19 opposite the air outlet 18, a fluidically favorable arrangement is achieved. When the internal combustion engine is stopped, the unburned hydrocarbons flow out of the combustion chamber of the internal combustion engine through the air outlet 18 into the interior of the round filter element 13 where they can be adsorbed by the adsorbent element 19. The air does not flow through, or flows only partially through, this element.

Conversely, when the internal combustion engine is running, the intake air flows through the round filter element 13 and thereby desorbs the adsorbent element 19. Here, too, the combustion air does not flow through, or flows only partially through, the adsorbent element 19. Arranging the adsorbent element on the filtered side of the round filter element 13 has the advantage that the adsorbent element 19 can be designed as a lifetime component because clogging by particles is virtually eliminated.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An air filter comprising a housing with at least one unfiltered air inlet and at least one filtered air outlet; a round filter element sealingly disposed in said housing between the unfiltered air inlet and the filtered air outlet, and an adsorber element comprising adsorbent particles disposed on an inner housing wall of the housing such that the adsorber element is disposed within the round filter element, wherein the adsorber element is a filter element having substantially the shape of a cone or a truncated cone made of a pleated filter medium and provided with adsorbent particles.

2. An air filter according to claim 1, wherein the adsorber element has an axial end face with a substantially round or oval cross-sectional shape and is substantially in the shape of a cone or a truncated cone.

3. An air filter according to claim 1, wherein the adsorber element comprises a support grid.

4. An air filter according to claim 1, wherein the adsorber element is disposed substantially opposite the filtered air outlet.

5. An air filter according to claim 1, wherein the adsorber element is disposed adjacent the filtered air outlet concentrically to the filtered air outlet.

6. An air filter according to claim 1, wherein the adsorber element is releasably connected to an interior wall of the housing.

7. An air filter according to claim 1, wherein the adsorber element is permanently connected to an interior wall of the housing.

8. An air filter according to claim 1, wherein said air filter is connected to an air intake of an internal combustion engine.

* * * * *